US008803877B1

(12) United States Patent
Galt et al.

(10) Patent No.: US 8,803,877 B1
(45) Date of Patent: Aug. 12, 2014

(54) SYSTEMS AND METHODS FOR CREATING A TWO-DIMENSIONAL REPRESENTATION OF A MODEL

(75) Inventors: Stuart Alan Galt, Maple Valley, WA (US); John Thomas Collingwood, Des Moines, WA (US)

(73) Assignee: The Boeing Company, Chicago, IL (US)

( * ) Notice: Subject to any disclaimer, the term of this patent is extended or adjusted under 35 U.S.C. 154(b) by 501 days.

(21) Appl. No.: 12/896,845

(22) Filed: Oct. 2, 2010

(51) Int. Cl.
*G06T 15/40* (2011.01)

(52) U.S. Cl.
USPC .......................................... 345/421; 345/440

(58) Field of Classification Search
CPC ....... G06T 15/40; G06T 15/405; G06T 15/06; G06T 15/005; G06T 15/20
See application file for complete search history.

(56) References Cited

U.S. PATENT DOCUMENTS

| 5,745,666 | A * | 4/1998 | Gilley et al. | 345/428 |
| 6,720,963 | B2 * | 4/2004 | Yoshida et al. | 345/420 |
| 7,065,736 | B1 | 6/2006 | Schiek | |
| 7,584,080 | B2 | 9/2009 | Taylor et al. | |
| 7,703,011 | B2 * | 4/2010 | Yamakado et al. | 715/243 |
| 8,203,747 | B2 * | 6/2012 | Owen | 358/1.8 |
| 2003/0117405 | A1 * | 6/2003 | Hubrecht et al. | 345/543 |
| 2006/0210148 | A1 | 9/2006 | Nakashima | |
| 2007/0109310 | A1 * | 5/2007 | Xu et al. | 345/581 |
| 2007/0236499 | A1 * | 10/2007 | Mihara et al. | 345/441 |

\* cited by examiner

*Primary Examiner* — Kee M Tung
*Assistant Examiner* — Michelle Chin
(74) *Attorney, Agent, or Firm* — Armstrong Teasdale LLP

(57) ABSTRACT

A method of creating a two-dimensional representation of a model. The method including receiving data corresponding to a first component, defining a first component representation corresponding to the first component, the first component representation including one or more closed graphics, a visibility of one or more edges of the one or more closed graphics, and coordinates of the one or more closed graphics that correspond to the first component, defining a structure of the first component representation, determining if the first component includes one more self-occluding and/or mutually occluding closed graphics, based on the determination that the first component includes one or more self-occluding and/or mutually occluding closed graphics, splitting each self-occluding and/or mutually occluding closed graphic into two or more non-occluding closed graphics, defining an occluding order of the closed graphics, and generating an illustration file.

20 Claims, 13 Drawing Sheets

SYSTEMS AND METHODS FOR CREATING A TWO-DIMENSIONAL REPRESENTATION OF A MODEL

BACKGROUND

The present disclosure relates generally to systems and methods of creating a two-dimensional representation of a model, and more specifically, to systems and methods for creating and storing a plurality of configurations (e.g., combinations of visible components) of a two-dimensional illustration in a single standard illustration file that enables a user to interactively display a selected configuration.

Conventional systems and methods of creating a two-dimensional model use lines to represent visible edges of a component. For example, as shown in FIG. 1, a two-dimensional model that includes components 102 and 104 is shown. Each component includes lines that represent edges of a cube. However, a placement and orientation of components may result in components overlapping other components. For example, as shown in FIG. 2, component 102 overlaps a portion of component 104. To preserve an appearance of each of the components, the overlapped segments of the lines from component 104 may be removed, as shown in FIG. 3. When a selected configuration does not include components that overlap other components, visible components may be missing segments of lines that represent the visible components, as shown in FIG. 4.

To overcome the deficiencies of the methods and systems that use lines to represent visible edges of a component, other conventional systems and methods use polygons to represent surfaces of a component. Using polygons preserves an appearance of the components when a placement and orientation results in the components overlapping and the overlapping components are no longer visible. However, a problem arises when a component overlaps another component in such a way that one of the components is both "in front of" and "behind" another component. For example, FIG. 5 shows a model 500 that includes three components, component 502, component 504, and component 506. However, component 502 is "behind" component 504, component 504 is "behind" component 506, and component 506 is "behind" component 502. Thus, because using polygons to represent surfaces of components requires each of the opaque closed path graphic elements to be displayed in a particular order when a placement and orientation of the polygons results in the components overlapping, conventional systems and methods cannot address a situation (such as shown in FIG. 5) where a component is both "in front of and behind" one or more other components. Therefore, as shown in FIG. 6, using conventional systems and methods result in component representation 602 to be shown "behind" component 604. However, in attempt to display component representation 602 is "behind" component representation 604, component representation 604 is "behind" component representation 606, and component representation 606 is "behind" component representation 602, using conventional systems and methods would result in component representation 606 not being able to be place both "in front of" component representation 602 and "behind" component representation 604.

SUMMARY

In one aspect, a method of creating a two-dimensional representation of a three-dimensional model is provided. The method includes receiving data corresponding to the first component, defining a first component representation corresponding to the first component, the first component representation including one or more closed graphics, a visibility of one or more edges of the one or more closed graphics, and coordinates of the one or more closed graphics that correspond to the first component, defining a structure of the first component representation with respect to each of the closed graphics, the visibility of the one or more edges of the one or more closed graphics, and coordinates of the closed graphics that correspond to the first component, determining if the first component includes one more self-occluding and/or mutually occluding closed graphics based on an orientation of the first component, based on the determination that the first component includes one or more self-occluding and/or mutually occluding closed graphics, splitting each self-occluding and/or mutually occluding closed graphic into two or more non-occluding closed graphics, defining an occluding order of the closed graphics, and generating an illustration file.

In another aspect, a system for creating a two-dimensional representation of a three-dimensional model is provided. The system includes a memory area for storing the two-dimensional representation and model data, and processor programmed. The processor is programmed to receive data corresponding to the first component, define a first component representation corresponding to the first component, the first component representation including one or more closed graphics, a visibility of one or more edges of the one or more closed graphics, and coordinates of the one or more closed graphics that correspond to the first component, define a structure of the first component representation with respect to each of the closed graphics, the visibility of the one or more edges of the one or more closed graphics, and coordinates of the closed graphics that correspond to the first component, determine if the first component includes one or more self-occluding and/or mutually occluding closed graphics based on an orientation of the first component, based on the determination that the first component includes one or more self-occluding and/or mutually occluding closed graphics, split each self-occluding and/or mutually occluding closed graphic into two or more non-occluding closed graphics, define an occluding order of the closed graphics, and generate an illustration file.

In yet another aspect, one or more computer-readable media having computer-executable modules are provided. The modules include an interface module that when executed by at least one processor causes the at least one processor to receiving data corresponding to the first component, a creation module that when executed by at least one processor causes the at least one processor to define a first component representation corresponding to the first component, the first component representation including one or more closed graphics, a visibility of one or more edges of the one or more closed graphics, and coordinates of the one or more closed graphics that correspond to the first component, define a structure of the first component representation with respect to each of the closed graphics, the visibility of the one or more edges of the one or more closed graphics, and coordinates of the closed graphics that correspond to the first component, determining if the first component includes one more self-occluding and/or mutually occluding closed graphics based on an orientation of the first component, based on the determination that the first component includes one or more self-occluding and/or mutually occluding closed graphics, split each self-occluding and/or mutually occluding closed graphic into two or more non-occluding closed graphics, define an occluding order of the closed graphics, and generate an illustration file.

BRIEF DESCRIPTION OF THE DRAWINGS

The present disclosure is described in detail below with reference to the attached drawing figures.

DETAILED DESCRIPTION

Configurable two-dimensional illustrations described herein provide an ability to store multiple configurations (e.g., combinations of visible components) in a single standard illustration file that a user can interactively configure to display a selected configuration. Unlike conventional two-dimensional models, the systems and methods described herein address a situation where a closed graphic (e.g., a graphic defined by a closed path with an opaque interior, such as a circle, an ellipse, a polygon, and the like) overlaps itself or another closed graphic in such a way that the closed graphic is both "in front of" (e.g., occluding) and "behind" (e.g., occluded) itself or another closed object. Further, while aspects of the present disclosure are directed to creating a two-dimensional representation of a three-dimensional model, one of ordinary skill in the art, guided by the teachings herein, will appreciate that aspects of the present disclosure are not limited to representations of three-dimensional models. For example, a two-dimensional representation may correspond to a model defined in two or more dimensions.

Figure 7:
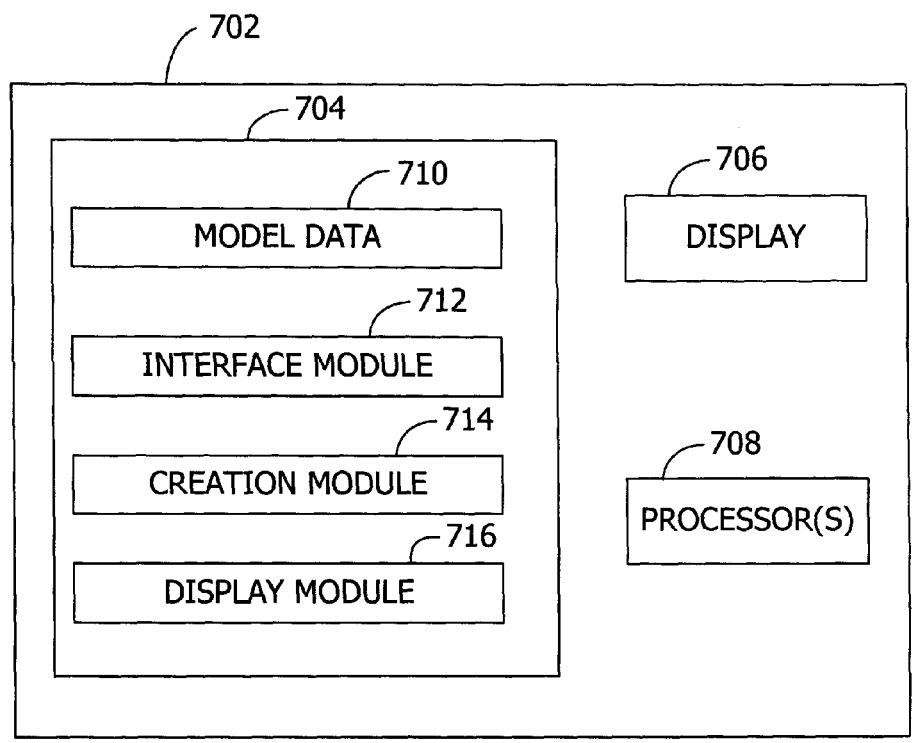
FIG. 7 is an exemplary block diagram of a computing device having a memory area storing modules for creating a two-dimensional representation of a three-dimensional model.

Referring now to FIG. 7, an exemplary block diagram illustrates a computing device 702 having, a memory area 704, a display 706, and at least one processor 708. The display 706 may be, for example, a display device separate from computing device 702, a display integrated into the computing device 302, a capacitive touch screen display, or a noncapacitive display. User input functionality may also be provided in display 706, where display 706 acts as a user input selection device such as in a touch screen.

Memory area 704 stores one or more computer-executable modules. Exemplary modules include, but are not limited to model data 710, an interface module 712, a creation module 714, and a display module 716. While the modules are shown to be stored in memory area 704, the modules may be stored and executed from a memory area remote from computing device 702. For example, data may be stored in a cloud service, a database, or other memory area accessible by computing device 702. Such embodiments reduce the computational and storage burden on computing device 702.

Processor 708 executes computer-executable instructions for implementing aspects of the disclosure. In some embodiments, processor 708 is transformed into a special purpose microprocessor by executing computer-executable instructions or by otherwise being programmed. For example, interface module 712, when executed by processor 708, causes processor 708 to receive data corresponding to a plurality of three-dimensional components. Three-dimensional models include three-dimensional components with surfaces and edges. Thus, the data may include information corresponding to each surface and each edge that make up each three-dimensional component. Creation module 714, when executed by processor 708, causes processor 708 to define each of the plurality of representation components that correspond to each of the plurality of three-dimensional components. Each of the plurality of representation components includes one or more closed graphics, a visibility of one or more edges of the one or more closed graphics, and coordinates of the one or more closed graphics that correspond to the corresponding three-dimensional components. Creation module 714 further causes processor 708 to define a structure of each of the plurality of representation components with respect to each of the closed graphics, the visibility of the one or more edges of the one or more closed graphics, and coordinates of the closed graphics of the corresponding three-dimensional components.

Creation module 714, when executed by processor 708, causes processor 708 to determine whether each of the plurality of closed graphics overlaps a second closed graphic based on a placement and an orientation of each of the plurality of representation components. Creation module 714, when executed by processor 708, causes processor 708 to, based on a placement and orientation of each of the plurality of representation components, determine if each of the plurality of representation components includes self-occluding and/or mutually occluding closed graphics. For each of the plurality of representation components that are determined to include one or more self-occluding and/or mutually occluding closed graphics, each self-occluding and/or mutually occluding closed graphic is split into two or more closed graphics that are no longer self-occluding and/or mutually occluding.

Creation module 714, when executed by processor 708, causes processor 708 to determine if a closed graphic of each of the plurality of representation components is both occluding and occluded by a closed graphic of another one of the plurality of representation components based on a placement and an orientation of each of the plurality of representation components. For each of the plurality of representation components that are determined to include a closed graphic that is both occluding and occluded by a closed graphic of another one of the plurality of representation components, the occluding and occluded closed graphic is split into two closed graphics that are no longer occluding and occluded.

Creation module 714, when executed by processor 708, causes processor 708 to define an occluding order of the closed graphics and generate an illustration file.

In one embodiment, components of a two-dimensional representation may be group in hierarchical structures. Assemblies may contain sub-assemblies and/or components. Sub-assemblies may contain other sub-assemblies and/or components. A hierarchy of components is illustrated in the following example where Assembly 1 is made of Assembly 2 and Components 3 and 4, Assembly 2 is made of Components 1 and 2, and Assembly 3 is made of components 5 and 6.

```
Begin Assembly 1
    Begin Assembly 2
        Component 1
        Component 2
    End Assembly 2
    Component 3
    Component 4
End Assembly 1
Begin Assembly 3
    Component 5
    Component 6
End Assembly 3
```

A structure of a component is illustrated in the following example where a component identifier is "1" and the component contains four polygons.

```
Begin Component 1
    Polygon <edge visibility and coordinates>
    Polygon <edge visibility and coordinates>
    Polygon <edge visibility and coordinates>
    Polygon <edge visibility and coordinates>
End Component 1
```

Display module 716, when executed by processor 708, causes processor 708 to display the two-dimensional representation of a display device (e.g., display device 706).

Figure 8:
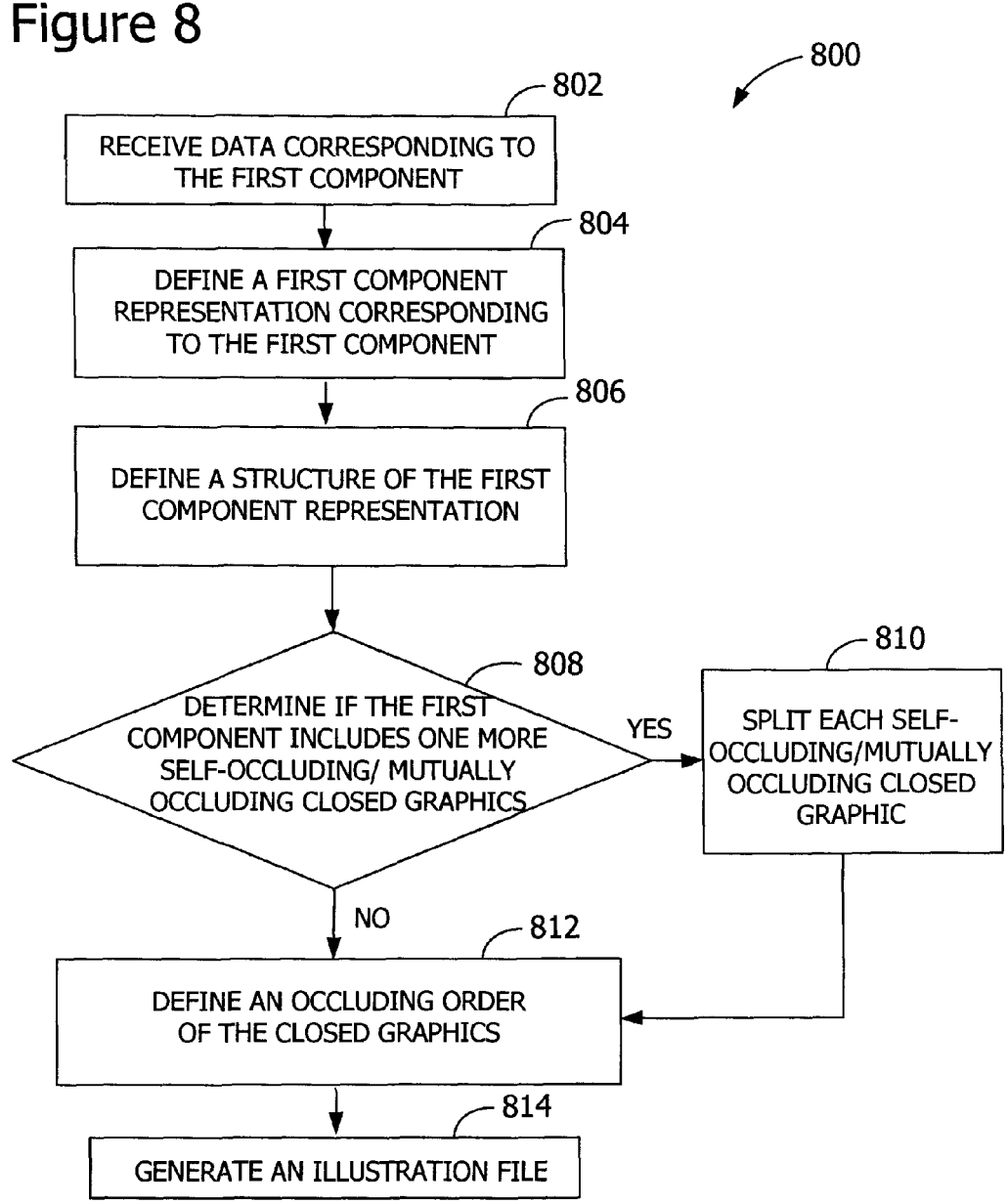
FIG. 8 is an exemplary flow chart illustrating a process for creating a two-dimensional representation of a model.

Referring next to FIG. 8, an exemplary flow chart illustrating a process 800 for creating a two-dimensional representation of a model that includes at least one component is shown. The two-dimensional representation includes at least one component representation corresponding to the first component and the at least one component.

The process begins at 802 where data corresponding to the at least one component is received. At 804, the at least one component representation is defined. In one embodiment, the at least one component representation includes one or more closed graphics, a visibility of one or more edges of the one or more closed graphics, and coordinates of the one or more closed graphics that correspond to the at least one component. At 806, a structure of the at least one component representation is defined with respect to each of the graphics, the visibility of the one or more edges of the one or more closed graphics, and coordinates of the closed graphics that correspond to the at least one component.

Figure 9:
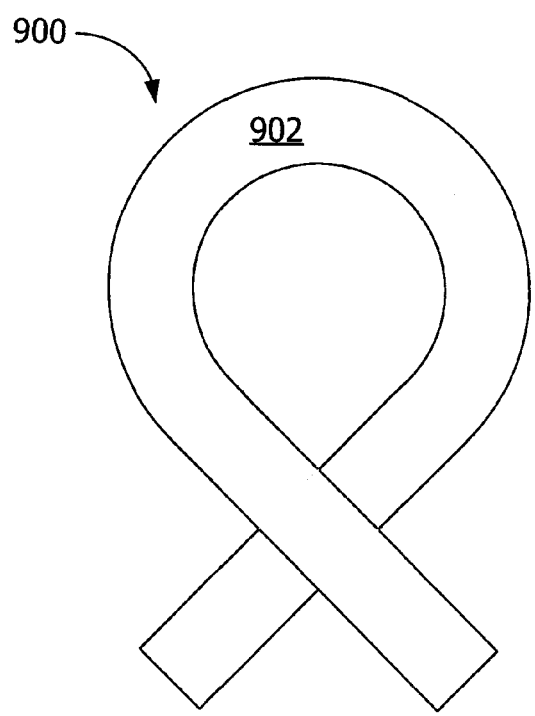
FIG. 9 shows an exemplary three-dimensional model.
Figure 10:
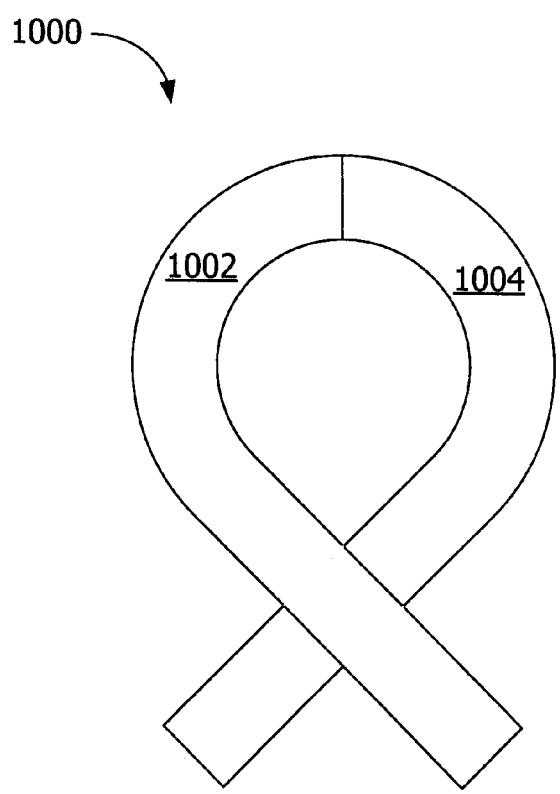
FIG. 10 shows a two-dimensional representation of the three-dimensional model shown in FIG. 9.

At 808, it is determined whether the at least one component representation includes a self-occluding and/or mutually occluding closed graphic based on an orientation of the at least one component representation. If it is not determined that the at least one component representation includes self-occluding and/or mutually occluding closed graphics, at 812, an occluding order of the closed graphics is defined. If at 808, it is determined that the at least one component representation includes self-occluding and/or mutually occluding closed graphics, at 810, each self-occluding and/or mutually occluding closed graphic is split into two or more non-occluding closed graphics that are no longer self-occluding and/or mutually occluding. For example, as shown in FIG. 9, model 900 includes a self-occluding closed graphic (e.g., polygon 902). That is, polygon 902 "overlaps" itself Thus, when creating a two-dimensional representation of polygon 902, the self-occluding closed graphic representation of polygon 902 is split into two or more non-occluding closed graphics that are no longer self-occluding and/or mutually occluding. For example, a two-dimensional representation of model 900 is shown in FIG. 10 as two-dimensional representation 1000. However, because it was determined that polygon 902 is a self-occluding closed graphic, a representation of polygon 902 is split into two non-occluding closed graphics 1002 and 1004. In one embodiment, the two-dimensional representation is displayed on a display device. In one embodiment, the displaying includes determining a visibility of the first component representation based on a selected configuration; and setting a visibility of the structure based on the visibility of the first component representation.

Figure 11:
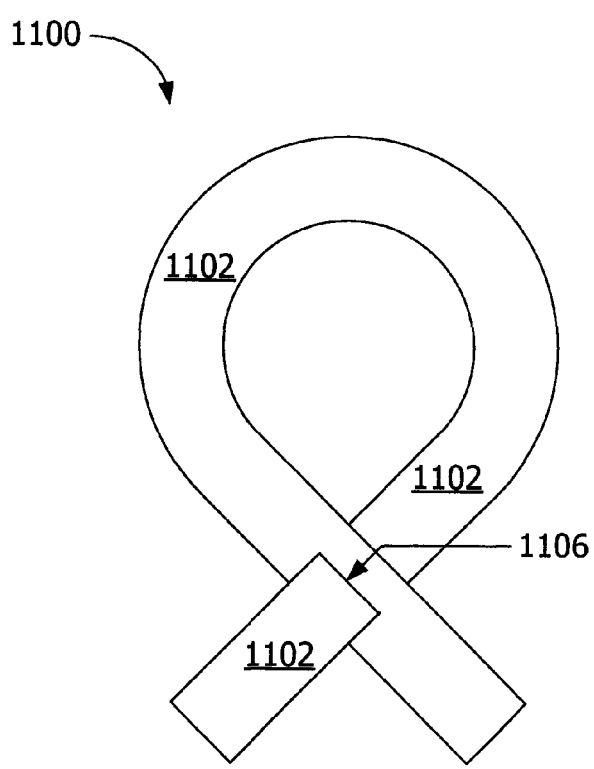
FIG. 11 shows an exemplary three-dimensional model.
Figure 12:
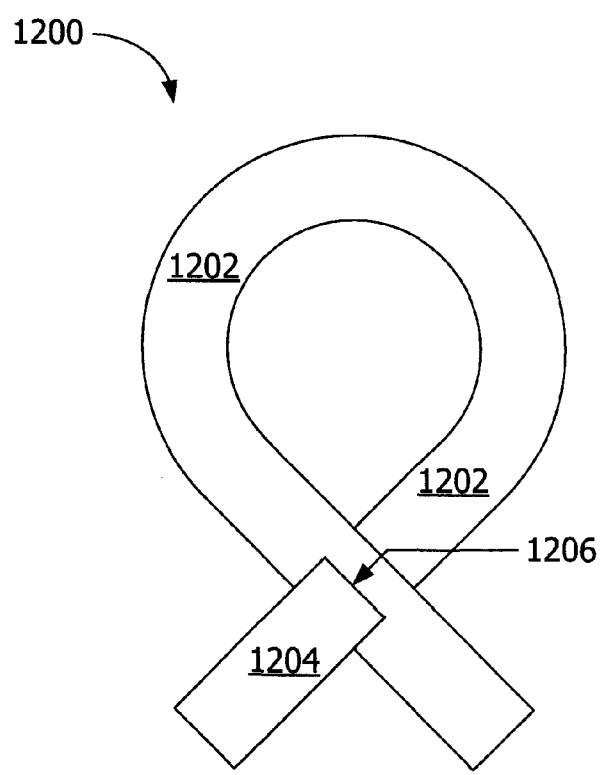
FIG. 12 shows a two-dimensional representation of the three-dimensional model shown in FIG. 11.

In a further embodiment, it is also determined whether a closed graphic intersects another closed graphic. If it is determined that a closed graphic does not intersect another closed graphic, an order of each closed graphic is defined in occluding order. If, however, it is determined that a closed graphic intersects another closed graphic, an open graphic (e.g., a graphic defined by an open path, such as a line, an arc, and the like) is defined to represent one or more intersections to the intersected closed graphic when each of the intersecting closed graphic and the intersected closed graphic are displayed simultaneously. For example, as shown in FIG. 11, model 1100 includes a closed graphic (e.g., polygon 1102) that intersects itself at intersection 1106. That is, polygon 1102 "penetrates" itself Thus, when creating a two-dimensional representation of polygon 1102, a self-intersecting graphic representation of polygon 902 is split into two or more non-occluding closed graphics that are no longer self-occluding and/or mutually occluding. For example, a two-dimensional representation of model 1100 is shown in FIG. 12 as two-dimensional representation 1200. However, because it was determined that polygon 1102 is a self-intersecting closed graphic, a representation of polygon 1102 is split into two non-intersecting closed graphics 1202 and 1204, with line 1206 representing a line of intersection.

With reference back to FIG. 8, at 814, an illustration file is generated. In one embodiment, if it is determined that a closed graphic does not intersect another closed graphic, the illustration file includes the structure of the first component representation, each closed graphic and the coordinates of each closed graphic in the defined order. In a further embodiment, if it is determined that a closed graphic does not intersect another closed graphic, the illustration file includes the structure of the intersected closed graphic and the open graphic and the coordinates of the open graphics in the structure that includes the intersecting closed graphic. The content of a generated illustration file is illustrated in the following example:

```
Begin Component n
    Graphic of component n
    . . .
    Graphic of component n
End Component n
. . .
Begin Component n
    Graphic of component n
    . . .
    Graphic of component n
End Component n
```

Figure 13:
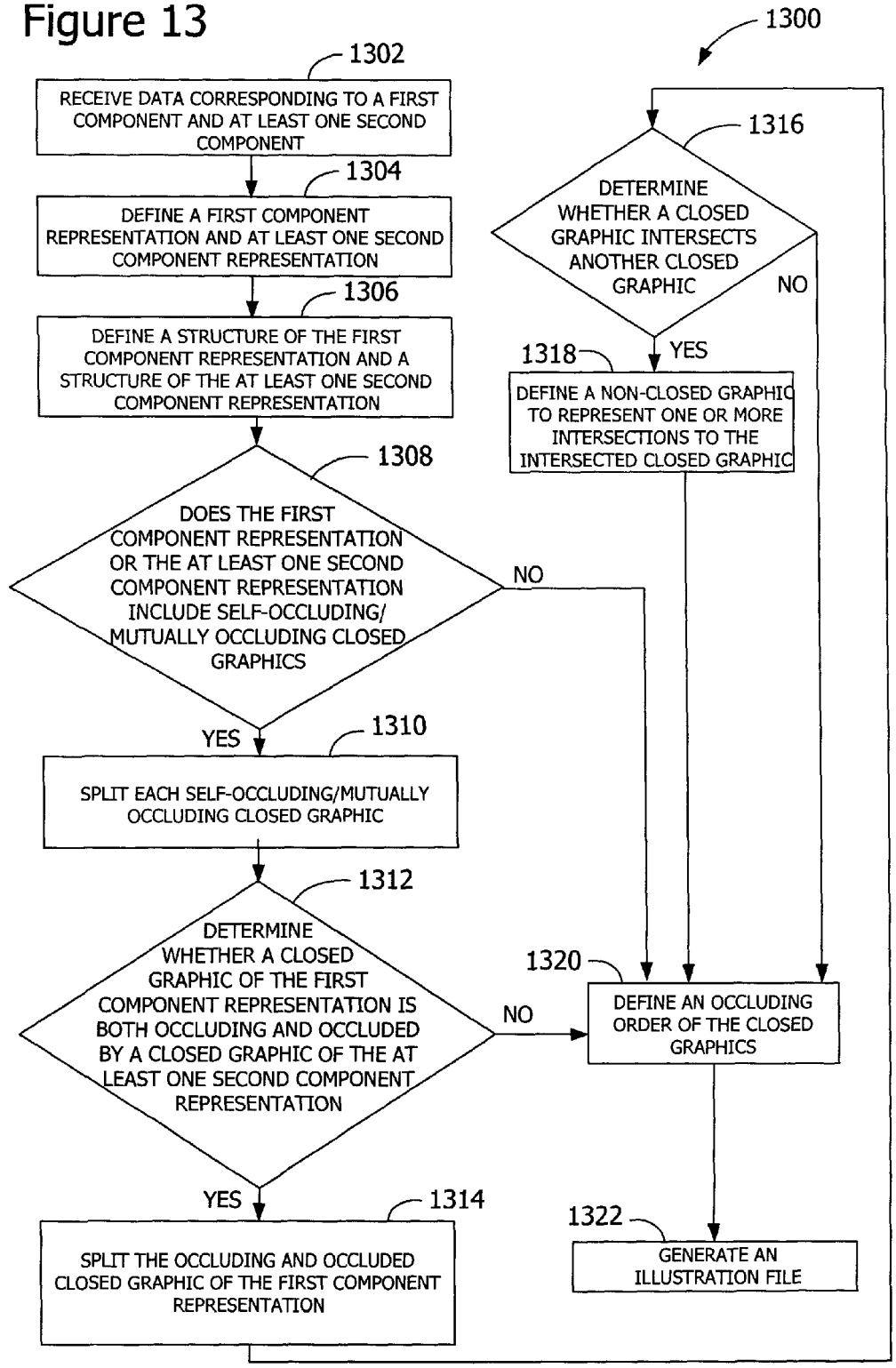
FIG. 13 is an exemplary flow chart illustrating a process for creating a two-dimensional representation of a model using closed graphics.

Referring next to FIG. 13, an exemplary flow chart illustrating a process 1300 for creating a two-dimensional representation of a model that includes a plurality of components (e.g., a first component and at least one second component) is shown. The two-dimensional representation includes a plurality of representation components that correspond to each of the plurality of components in the model. More specifically, the two-dimensional representation described herein includes a first component representation that corresponds to the first component of the model, and at least one second component representation that corresponds to the at least one second component of the model.

The process 1300 begins at 1302 where data corresponding to the first component and the at least one second component is received. At 1304, the first component representation and the at least one second component representation is defined. In one embodiment, the first component representation includes one or more closed graphics, a visibility of one or more edges of the one or more closed graphics, and coordinates of the one or more closed graphics that correspond to the first component, and the least one second component representation includes one or more closed graphics, a visibility of one or more edges of the one or more closed graphics, and coordinates of the one or more closed graphics that correspond to the at least one second component.

At 1306, a structure of the first component representation and a structure of the at least one second component representation is defined. For example, the first component representation is defined with respect to each of the graphics, the visibility of the one or more edges of the one or more closed graphics, and coordinates of the closed graphics that correspond to the first component, and the at least one second component representation is defined with respect to each of the graphics, the visibility of the one or more edges of the one or more closed graphics, and coordinates of the closed graphics that correspond to the at least one second component.

At 1308, it is determined whether the first component representation and the at least one second component representation includes self-occluding and/or mutually occluding closed graphics based on an orientation of the first component representation and/or an orientation of the at least one second component representation.

At 1310, for each of the first component representation and the at least one second component representation that is determined to include self-occluding and/or mutually occluding closed graphics, each self-occluding and/or mutually occluding closed graphic is split into two or more non-occluding closed graphics that are no longer self-occluding and/or mutually occluding.

At 1312, based on a position and orientation of the first component representation and a position and orientation of the at least one second component representation, it is determined whether a closed graphic of the first component representation is both occluding and occluded by a closed graphic of the at least one second component representation.

At 1314, if it is determined that a closed graphic of the first component representation is not both occluding and occluded by a closed graphic of the at least one second component representation, the processes continues to 1320 where an order of each closed graphic is defined in occluding order. However, if it is determined that a closed graphic of the first component representation is both occluding and occluded by a closed graphic of the at least one second component representation, at 1314, the occluding and occluded closed graphic of the first component representation is split into two closed graphics that are no longer occluding and occluded.

At 1316, it is determined whether a closed graphic intersects another closed graphic. If it is determined that a closed graphic does not intersect another closed graphic, at 1320, an order of each closed graphic is defined in occluding order. If, however, it is determined that a closed graphic does intersect another closed graphic, at 1318, an open graphic is defined to represent one or more intersections to the intersected closed graphic when each of the intersecting closed graphic and the intersected closed graphic are displayed simultaneously. At 1320, an order of each closed graphic in occluding order is defined.

Figure 1:
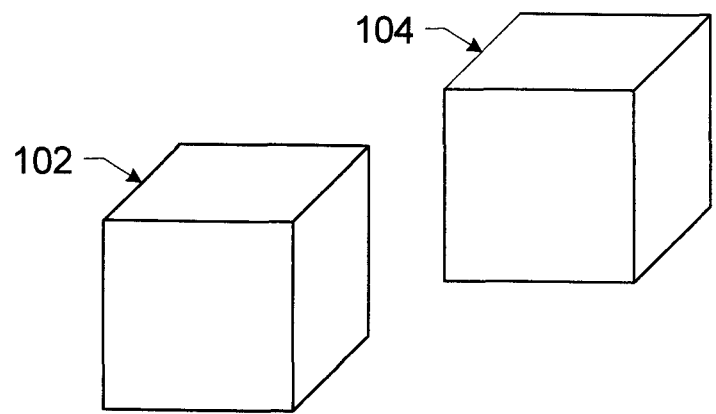
FIGS. 1-4 show conventional two-dimensional representations of a three-dimensional model.
Figure 2:
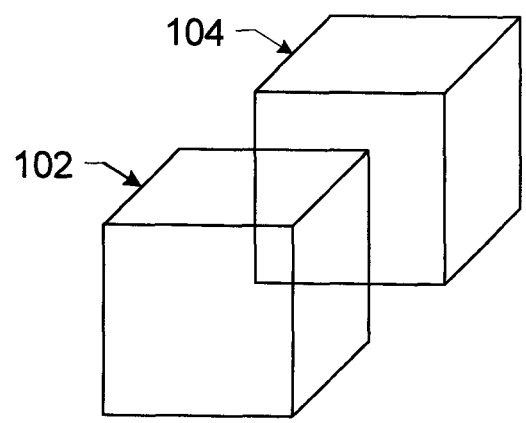
Figure 3:
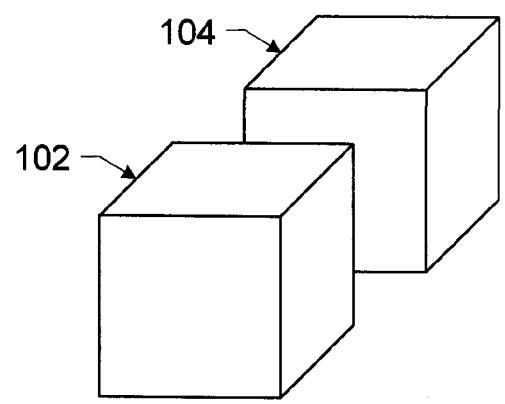
Figure 4:
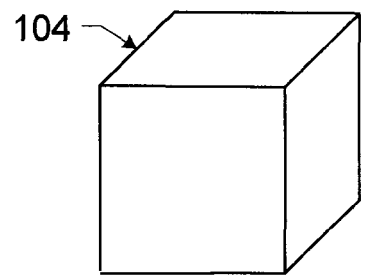
Figure 5:
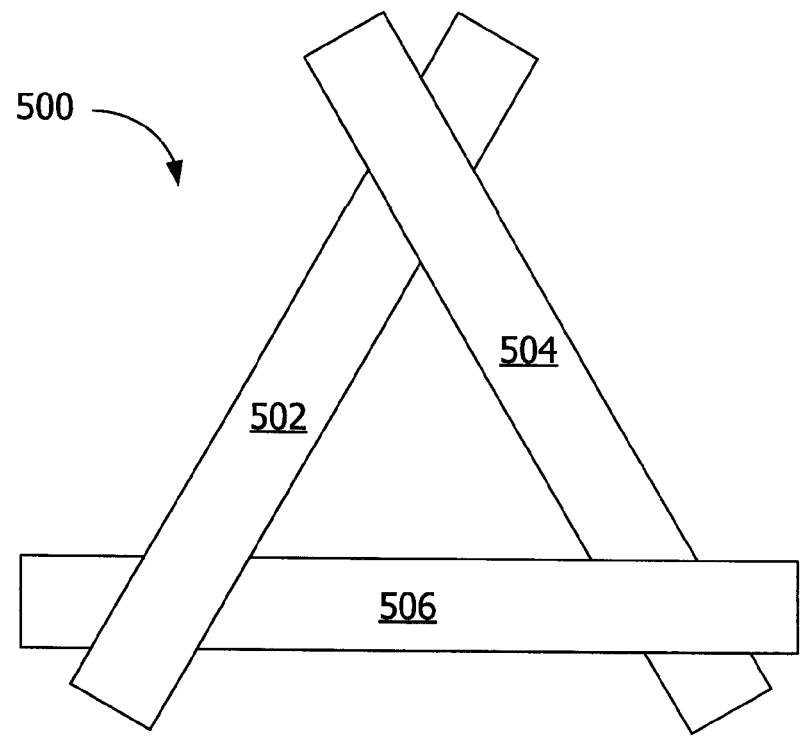
FIG. 5 shows an exemplary three-dimensional model.
Figure 14:
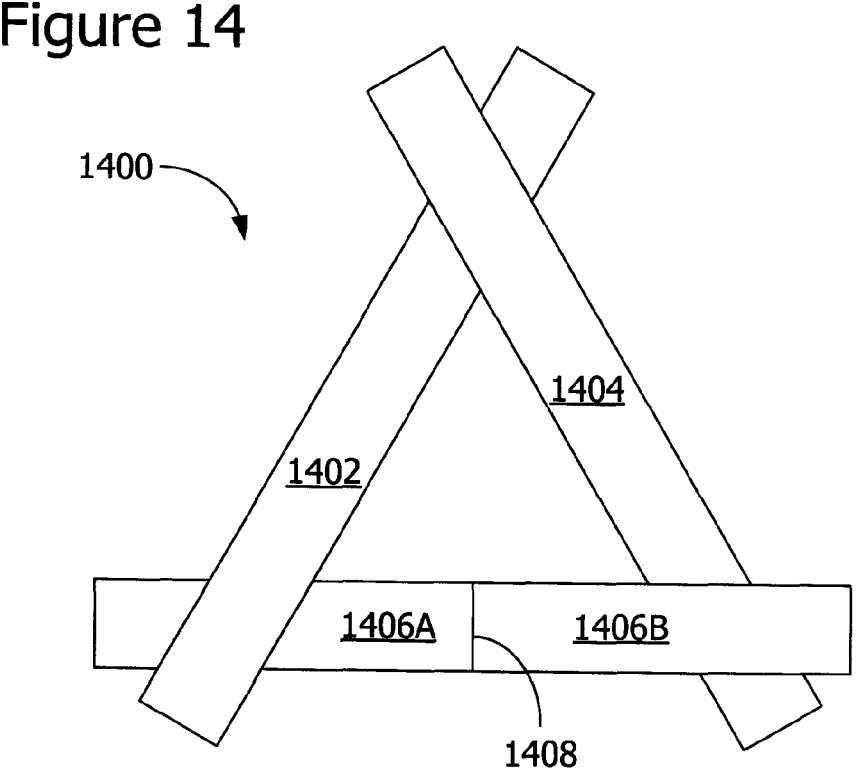
FIG. 14 shows a two-dimensional representation of the three-dimensional model shown in FIG. 5.
Figure 15:
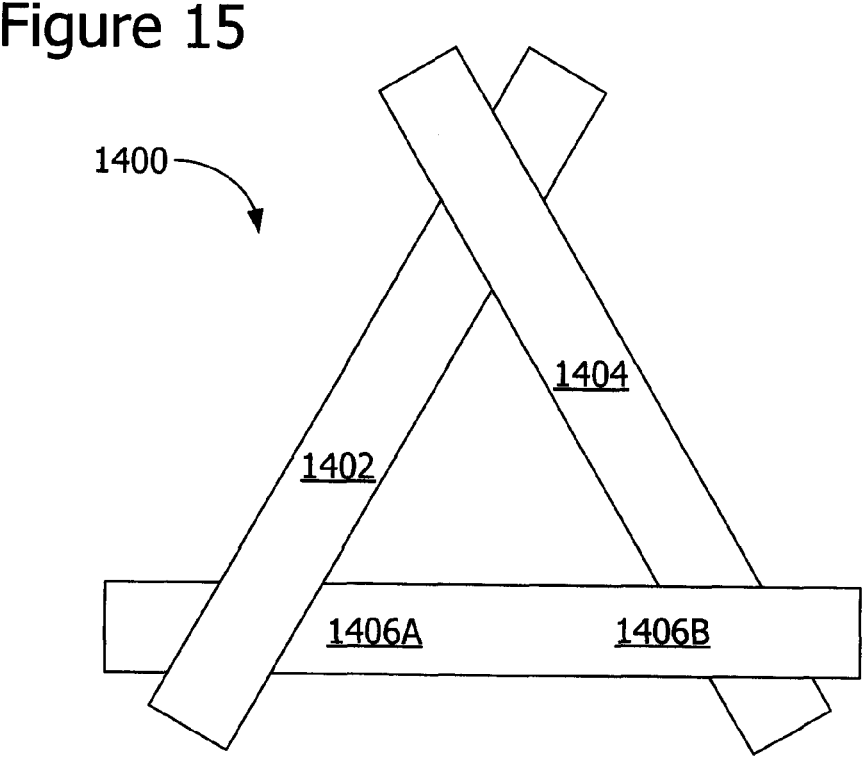
FIG. 15 shows a two-dimensional representation of the three-dimensional model shown in FIG. 5.

For example, with reference back to FIG. 5, model 500 includes three components, component 502, component 504, and component 506. Component 506 is occluded by component 502 and component 506 is occluding component 504. Thus, when a two-dimensional representation of model 500 is created, a representation of component 506 (e.g., component representation 1406 of FIG. 14) is split into two closed graphics that are no longer occluding and occluded (e.g., closed graphics 1406A and 1406B). However, because component representation 1406 is split into closed graphic 1406A and closed graphic 1406B, an edge 1408 exists a point where closed graphic 1406A and closed graphic 1406B meet. Therefore, to achieve a two-dimensional representation that is similar to model 500, edge 1408 is removed as shown in FIG. 15.

With reference back to FIG. 13, at 1322, an illustration file is generated. In one embodiment, if it is determined that a closed graphic of the first component representation is both occluding and occluded by a closed graphic of the at least one second component representation, the illustration file includes one or more structures of the first component representation, one or more closed graphics and coordinates of the one or more closed graphics of the first component, one or more structures of the at least one second component representation, one or more closed graphics and coordinates of the one or more closed graphics of the at least one second component representation in the defined order. If, however, it is determined that a closed graphic does not intersect another closed graphic, the illustration file includes the structure of the intersected closed graphic and the open graphic and the coordinates of the open graphics in the structure that includes the intersecting closed graphic.

Figure 6:
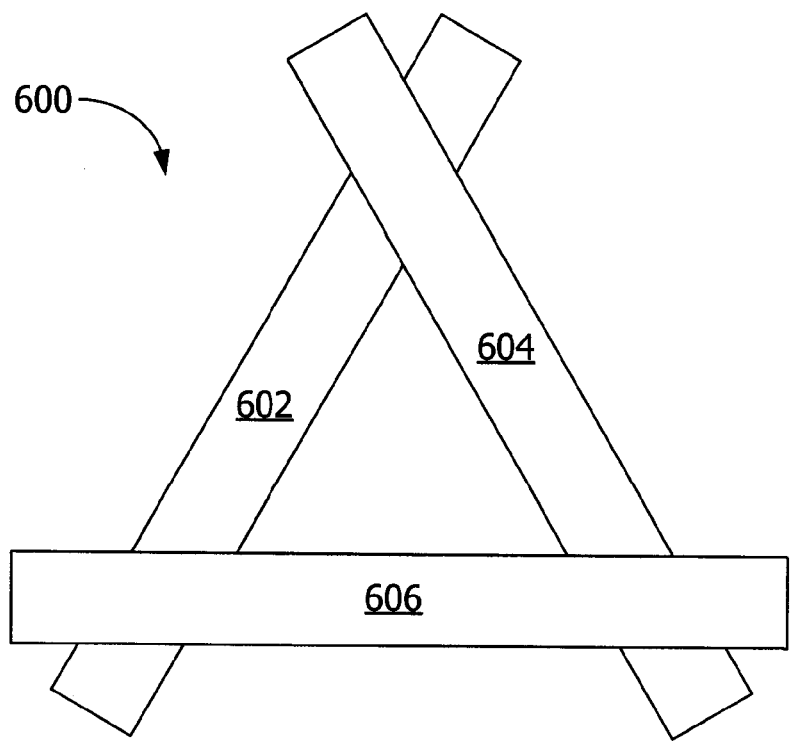
FIG. 6 shows a conventional two-dimensional representation of the three-dimensional model shown in FIG. 5.

For example, with reference back to FIG. 15, before representation component 1406 is split due to representation component being occluding and occluded by another component, a structure of two-dimensional representation 1400 looks similar to the structure of two-dimensional representation 600 in FIG. 6. Thus, before representation component 1406 is split, the structure of two dimensional representation 1400 is as follows:

Begin Component 1402
    Polygon 1402 <edge visibility and coordinates>
End Component 1402
Begin Component 1404
    Polygon 1404 <edge visibility and coordinates>
End Component 1404
Begin Component 1406
    Polygon 1406 <edge visibility and coordinates>
End Component 1406

However, when the intersecting closed graphic is split into two non-occluding and non-occluded closed graphics (as shown in FIG. 15), a structure of two-dimensional representation may be illustrated as follows:

Begin Component 1406
    Polygon 1406A <edge visibility and coordinates>
End Component 1406
Begin Component 1402
    Polygon 1402 <edge visibility and coordinates>
End Component 1402
Begin Component 1404
    Polygon 1404 <edge visibility and coordinates>
End Component 1404
Begin Component 1406
    Polygon 1406B <edge visibility and coordinates>
End Component 1406

With reference back to FIG. 13, the two-dimensional illustration is displayed on a display device. In one embodiment, displaying the two-dimensional representation includes determining a visibility of the first component representation and the at least one second component representation based on a selected configuration; and setting a visibility of one or more structures of the first component representation and the visibility of one or more structures of the at least one second component representation based on the visibility of the first component representation and the visibility of the at least one second component representation, respectively One of ordinary skill in the art guided by the teachings herein will appreciate that the processes described above are exemplary, and methods of creating and displaying a two-dimensional representation are not limited to the processes described in FIGS. 8 and 13.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of creating a two-dimensional representation of a model that includes a first component, the method comprising:
    receiving data corresponding to the first component;
    defining, by a processor, a first component representation corresponding to the first component, the first component representation including one or more closed graphics, wherein the one or more closed graphics are polygons, a visibility of one or more edges of the one or more closed graphics, and coordinates of the one or more closed graphics that correspond to the first component;
    defining a structure of the first component representation with respect to each of the closed graphics, the visibility of the one or more edges of the one or more closed graphics, and coordinates of the closed graphics that correspond to the first component;
    determining if the first component includes one more self-occluding and/or mutually occluding closed graphics based on an orientation of the first component;
    based on the determination that the first component includes one or more self-occluding and/or mutually occluding closed graphics, splitting each self-occluding and/or each mutually occluding closed graphic into two or more non-occluding closed graphics;
    defining an occluding order of the closed graphics; and
    generating an illustration file.

2. A method in accordance with claim 1, wherein the illustration file includes, in the defined order, the structure, each closed graphic, the visibility of the one or more edges of the one or more closed graphics, and the coordinates of each closed graphic.

3. A method in accordance with claim 1,
    wherein the two-dimensional model further includes at least one second component, and wherein the method further comprises:
    based on a position and orientation of the first component representation and a position and orientation of the at least one second component representation, determining if a closed graphic of the first component representation is both occluding and occluded by a closed graphic of the at least one second component representation, wherein the closed graphic of the at least one second component representation is a polygon;

based on determining if a closed graphic of the first component representation is both occluding and occluded by a closed graphic of the at least one second component representation, splitting the occluding and occluded closed graphic of the first component representation into two or more non-occluding and non-occluded closed graphics; and defining an occluding order of the closed graphics;

wherein the illustration file includes, in the defined order, one or more structures of the first component representation, one or more closed graphics of the first component representation, the visibility of the one or more edges of the one or more closed graphics of the first component representation, coordinates of the one or more closed graphics of the first component representation, one or more structures of the at least one second component representation, one or more closed graphics of the at least one second component representation, a visibility of one or more edges of the one or more closed graphics of the at least one second component representation, and coordinates of the one or more closed graphics of the at least one second component representation.

4. A method in accordance with claim 1, further comprising:

determining whether a closed graphic intersects another closed graphic; and defining an open graphic to represent one or more intersections to the intersected closed graphic when each of the intersecting closed graphic and the intersected closed graphic are displayed simultaneously;

wherein the illustration file further includes the structure of the intersected closed graphic and the open graphic and the coordinates of the open graphics in the structure that includes the intersecting closed graphic.

5. A method in accordance with claim 1, further comprising displaying the two-dimensional representation of the model on a display device.

6. A method in accordance with claim 5, wherein displaying the two-dimensional representation of the model on a display device comprises:

determining a visibility of the first component representation based on a selected configuration; and setting a visibility of the structure based on the visibility of the first component representation.

7. A method in accordance with claim 3, further comprising displaying the two-dimensional representation of the model on a display device, wherein displaying the two-dimensional representation of the model on a display device comprises:

determining a visibility of the first component representation and the at least one second component representation based on a selected configuration; and setting a visibility of one or more structures of the first component representation and the visibility of one or more structures of the at least one second component representation based on the visibility of the first component representation and the visibility of the at least one second component representation, respectively.

8. A system for creating a two-dimensional representation of a model, the system comprising:

a memory area for storing the two-dimensional representation and model data; and a processor programmed to:

receive data corresponding to the first component;

define a first component representation corresponding to the first component, the first component representation including one or more closed graphics, wherein the one or more closed graphics are polygons, a visibility of one or more edges of the one or more closed graphics, and coordinates of the one or more closed graphics that correspond to the first component;

define a structure of the first component representation with respect to each of the closed graphics, the visibility of the one or more edges of the one or more closed graphics, and coordinates of the closed graphics that correspond to the first component;

determining if the first component includes one more self-occluding and/or mutually occluding closed graphics based on an orientation of the first component;

based on the determination that the first component includes one or more self-occluding and/or mutually occluding closed graphics, split each self-occluding and/or mutually occluding closed graphic into two or more non-occluding closed graphics;

define an occluding order of the closed graphics; and generate an illustration file.

9. A system in accordance with claim 8, wherein the illustration file includes, in the defined order, the structure, each closed graphic, the visibility of the one or more edges of the one or more closed graphics, and the coordinates of each closed graphic.

10. A system in accordance with claim 8 wherein the two-dimensional model further includes at least one second component, and wherein the processor is further programmed to:

based on a position and orientation of the first component representation and a position and orientation of the at least one second component representation, determine if a closed graphic of the first component representation is both occluding and occluded by a closed graphic of the at least one second component representation, wherein the closed graphic of the at least one second component representation is a polygon;

based on determining if a closed graphic of the first component representation is both occluding and occluded by a closed graphic of the at least one second component representation, split the occluding and occluded closed graphic of the first component representation into two or more non-occluding and non-occluded closed graphics; and defining an occluding order of the closed graphics;

wherein the illustration file includes, in the defined order, one or more structures of the first component representation, one or more closed graphics of the first component representation, the visibility of the one or more edges of the one or more closed graphics of the first component representation, coordinates of the one or more closed graphics of the first component representation, one or more structures of the at least one second component representation, one or more closed graphics of the at least one second component representation, a visibility of one or more edges of the one or more closed graphics of the at least one second component representation, and coordinates of the one or more closed graphics of the at least one second component representation.

11. A system in accordance with claim 8, wherein the processor is further programmed to:

determine whether a closed graphic intersects another closed graphic; and define an open graphic to represent one or more intersections to the intersected closed graphic when each of the intersecting closed graphic and the intersected closed graphic are displayed simultaneously;

wherein the illustration file further includes the structure of the intersected closed graphic and the open graphic and the coordinates of the open graphics in the structure that includes the intersecting closed graphic.

12. A system in accordance with claim 8, wherein the processor is further programmed to display the two-dimensional representation of the model on a display device.

13. A system in accordance with claim 12, wherein displaying the two-dimensional representation of the model on a display device comprises:

determining a visibility of the first component representation based on a selected configuration; and setting a visibility of the structure based on the visibility of the first component representation.

14. A system in accordance with claim 10, wherein the processor is further programmed to display the two-dimensional representation of the model on a display device, wherein displaying the two-dimensional representation of the model on a display device comprises:

determining a visibility of the first component representation and the at least one second component representation based on a selected configuration; and setting a visibility of one or more structures of the first component representation and the visibility of one or more structures of the at least one second component representation based on the visibility of the first component representation and the visibility of the at least one second component representation, respectively.

15. One or more non-transitory computer-readable media having computer-executable modules, the modules comprising:

an interface module that when executed by at least one processor causes the at least one processor to receive data corresponding to the first component; and a creation module that when executed by at least one processor causes the at least one processor to:

define a first component representation corresponding to the first component, the first component representation including one or more closed graphics, wherein the one or more closed graphics are polygons, a visibility of one or more edges of the one or more closed graphics, and coordinates of the one or more closed graphics that correspond to the first component;

define a structure of the first component representation with respect to each of the closed graphics, the visibility of the one or more edges of the one or more closed graphics, and coordinates of the closed graphics that correspond to the first component;

determining if the first component includes one more self-occluding and/or mutually occluding closed graphics based on an orientation of the first component;

based on the determination that the first component includes one or more self-occluding and/or mutually occluding closed graphics, split each self-occluding and/or mutually occluding closed graphic into two or more non-occluding closed graphics;

define an occluding order of the closed graphics; and generate an illustration file.

16. The non-transitory computer-readable media of claim 15, wherein the illustration file includes, in the defined order, the structure, each closed graphic, the visibility of the one or more edges of the one or more closed graphics, and the coordinates of each closed graphic.

17. The non-transitory computer-readable media of claim 15, wherein the two-dimensional model further includes at least one second component, wherein the creation module further causes the at least one processor to:

based on a position and orientation of the first component representation and a position and orientation of the at least one second component representation, determine if a closed graphic of the first component representation is both occluding and occluded by a closed graphic of the at least one second component representation, wherein the closed graphic of the at least one second component representation is a polygon;

based on determining if a closed graphic of the first component representation is both occluding and occluded by a closed graphic of the at least one second component representation, split the occluding and occluded closed graphic of the first component representation into two or more non-occluding and non-occluded closed graphics; and define an occluding order of the closed graphics;

wherein the illustration file includes, in the defined order, one or more structures of the first component representation, one or more closed graphics of the first component representation, the visibility of the one or more edges of the one or more closed graphics of the first component representation, coordinates of the one or more closed graphics of the first component representation, one or more structures of the at least one second component representation, one or more closed graphics of the at least one second component representation, a visibility of one or more edges of the one or more closed graphics of the at least one second component representation, and coordinates of the one or more closed graphics of the at least one second component representation.

18. The non-transitory computer-readable media of claim 17, wherein the creation module further causes the at least one processor to:

determine whether a closed graphic intersects another closed graphic; and define an open graphic to represent one or more intersections to the intersected closed graphic when each of the intersecting closed graphic and the intersected closed graphic are displayed simultaneously;

wherein the illustration file further includes the structure of the intersected closed graphic and the open graphic and the coordinates of the open graphics in the structure that includes the intersecting closed graphic.

19. The non-transitory computer-readable media of claim 15, further comprising a display module that when executed by at least one processor causes the at least one processor to display the two-dimensional representation of the model on a display device, wherein displaying the two-dimensional representation of the model on a display device comprises:

determining a visibility of each closed graphic based on a selected configuration; and setting a visibility of the structure based on the selected configuration.

20. The non-transitory computer-readable media of claim 17, further comprising a display module that when executed by at least one processor causes the at least one processor to display the two-dimensional representation of the model on a display device, wherein displaying the two-dimensional representation of the model on a display device comprises:

determining a visibility of each closed graphic based on a selected configuration; and setting a visibility of each structure based on the selected configuration.

* * * * *